US010290224B2

(12) United States Patent
Nececkas

(10) Patent No.: US 10,290,224 B2
(45) Date of Patent: May 14, 2019

(54) INTERACTIVE OUTLINE AS METHOD FOR LEARNING

(71) Applicant: Thomas William Nececkas, Burlington, VT (US)

(72) Inventor: Thomas William Nececkas, Burlington, VT (US)

( * ) Notice: Subject to any disclaimer, the term of this patent is extended or adjusted under 35 U.S.C. 154(b) by 262 days.

(21) Appl. No.: 15/330,423

(22) Filed: Sep. 19, 2016

(65) Prior Publication Data

US 2018/0082604 A1  Mar. 22, 2018

(51) Int. Cl.
G09B 7/08  (2006.01)
G09B 5/06  (2006.01)

(52) U.S. Cl.
CPC .............. *G09B 7/08* (2013.01); *G09B 5/065* (2013.01)

(58) Field of Classification Search
None
See application file for complete search history.

(56) References Cited

U.S. PATENT DOCUMENTS 6,470,170 B1 * 10/2002 Chen .................... G09B 5/14
434/350
2017/0199648 A1 * 7/2017 Raffo .................. G06F 3/04817

* cited by examiner

*Primary Examiner* — Sunit Pandya

(57) ABSTRACT

Systems and methods for learning one or more subject areas. The methods may comprise an interactive outline learning system, in which the subject area may be organized into one or more multi-layered outlines, and lines may connect elements in each layer with related elements in adjacent layers. Each layer of the outline may correspond to one or more steps in the analysis of a question presented about the subject area. The systems may include a user interface component which may receive input comprising a first selection of an element from the first level of the outline, and then selections from subsequent layers of the outline. The methods may include determining whether each selection correctly corresponds with a step in the analysis of the question, and may visually indicate the correct element and/or connecting lines in response to a correct selection.

16 Claims, 11 Drawing Sheets

INTERACTIVE OUTLINE AS METHOD FOR LEARNING

CROSS-REFERENCES

This application claims the benefit of provisional application No. 62/219,638 filed on Sep. 17, 2015, which is incorporated by reference herein.

BACKGROUND

Many subject areas can be organized into multi-layered outlines. Some example embodiments of the present invention may present one or more multi-layered outlines as interactive learning tools. An interactive outline as a method for learning can promote better understanding of a subject's content. In particular, an interactive outline as a method for learning can promote better understanding of the relationships among pieces of content, thereby promoting the creation of a mental framework for determining which content is applicable when analyzing a given question.

BRIEF DESCRIPTION OF THE DRAWINGS

Example embodiments of the present invention described herein will be discussed with reference to the following drawings.

SUMMARY

Some example embodiments of the present invention may provide an interactive outline learning system. In some example embodiments, the interactive outline learning system may include an outline component, configured to include content from a subject matter that is to be the focus of learning. And in some example embodiments, the outline component may be paired with one or more question components, which can be analyzed and/or answered by reference to the outline component.

Some example embodiments may further include a user interface component, which receives input from a user. In some example embodiments, the user interface component may receive input that corresponds to a portion or portions of the outline component.

Some example embodiments may further include a visual, auditory, and/or tactile component or components, which may indicate when input received from the user corresponds to the correct portion or portions of the outline, and/or may indicate when input received from the user corresponds to an incorrect portion of the outline. Also, some example embodiments may include a visual, auditory, and/or tactile component or components which indicates what portions of the outline may be responsive to the question (as but one example, the component(s) may indicate that out of all 20 outline components, these 5 components may answer this particular question.)

Some example embodiments may further include one or more explanation components, which explain why a certain portion of the outline component correctly corresponds with the question component, and/or why another portion or portions of the outline component does not correctly correspond with the question component.

In some example processes, the interactive outline learning system may be accessible by a computer system. In some processes, the interactive outline learning system may be accessible by a computer system connected to the Internet; in other processes, the interactive outline learning system may be accessible by a computer system regardless of any Internet connection. In other example processes, the interactive outline learning system may be accessible by a wireless communication device, such as a cell phone, or by any reasonable means.

DETAILED DESCRIPTION

Some example embodiments of the present invention may provide systems and procedures for learning subject matter. For instance, some example embodiments may provide systems and procedures which may display all or part of an outline of a subject area, may display a question or questions pertaining to the subject area, and may receive input from a user that correctly or incorrectly identifies the portion or portions of the outline that are responsive to the question.

Figure 1:
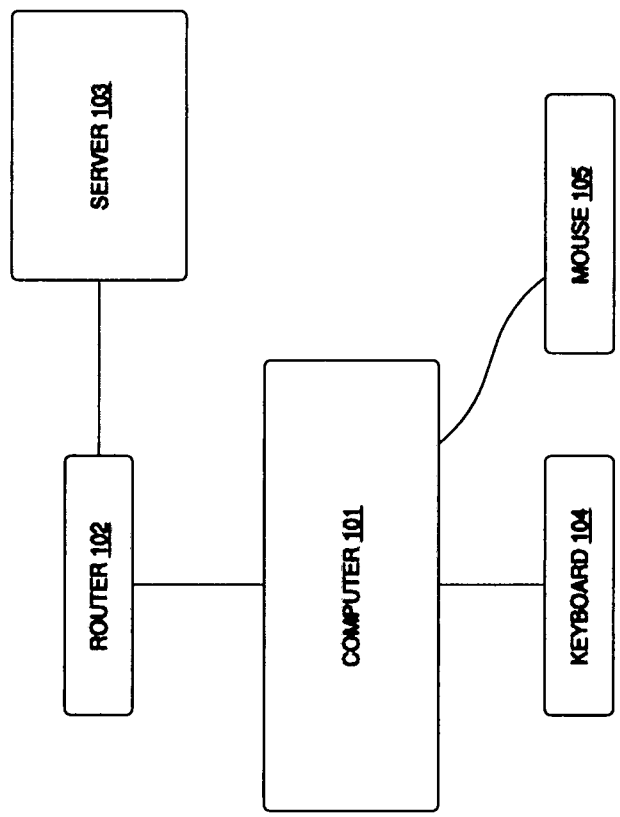
FIG. 1 illustrates a computer system on which the interactive outline learning system may operate.

FIG. 1 illustrates an example of a computer system on which an interactive outline learning system might operate. As illustrated, some example embodiments may contain a computer 101. The computer may be connected to a keyboard 104 and/or a mouse 105. In some example embodiments, the keyboard 104 and/or mouse 105 may receive input from a user. The computer may also be connected, either physically or wirelessly, to a router 102, which in turn communicates with a server 103. In some example embodiments, the server may store information, such as the content of outlines or questions, answers, and/or explanations corresponding to the outlines. In some example embodiments, there may be one server; in other example embodiments, there may be more than one server. For example, in some sample embodiments, the interactive outline learning system may be conveyed by a web server and a database server. For example, the web server might store each outline component, and the outline component may be displayed when a certain web page is navigated to. The database server may store each question component, as well as the answers corresponding to each particular question component, and each corresponding explanation component. The web server may request from the database server the question components in a pre-determined, random, or other reasonable order, and then display the question component to the user. In such an example embodiment, the computer or client-side may evaluate user input to determine if the user input matches the question component's answer component which had been stored in the database server. Based on whether or not the user input matches the correct answer, the computer or client-side may make visual changes to the outline, for example by employing a scripting language like javascript. Alternatively, in other example embodiments, most of the above components might be stored in a web server.

It is noted that any reasonable component configuration may be used and that in some example embodiments other components may substitute for those depicted in FIG. 1. For example, in place or in addition to the keyboard 104 and/or mouse 105, user input may be received by any user input device, such as a touch pad, a touch screen, a device that interprets a user's body or eye movement, and/or a microphone. For example, a touch screen might be used on a computer, tablet, cell phone, smart phone, or other similar device. As another example, a stand alone server might be used, such as if the information needed to depict the interactive outline learning system were stored on a disk, thumb drive, or other storage device; or if the entire interactive outline learning system were stored in another storage device, such in a program or file on a computer, such as would result from storage in a downloadable program or file. As another example, the computer 101 may not be used in other embodiments, for example if the outlines were depicted on a cell phone, smart phone, tablet, or another similar device. Any of these example devices could function as a display which is configured to display the outline, lines connecting elements in adjacent layers of the outline, and visual indicators if the input device receives a correct selection—components which are discussed infra, particularly in paragraphs 35 through 45. In some example embodiments, the interactive outline learning system might be conveyed through an app on a smart phone. The best system is that depicted in FIG. 1.

Figure 2:
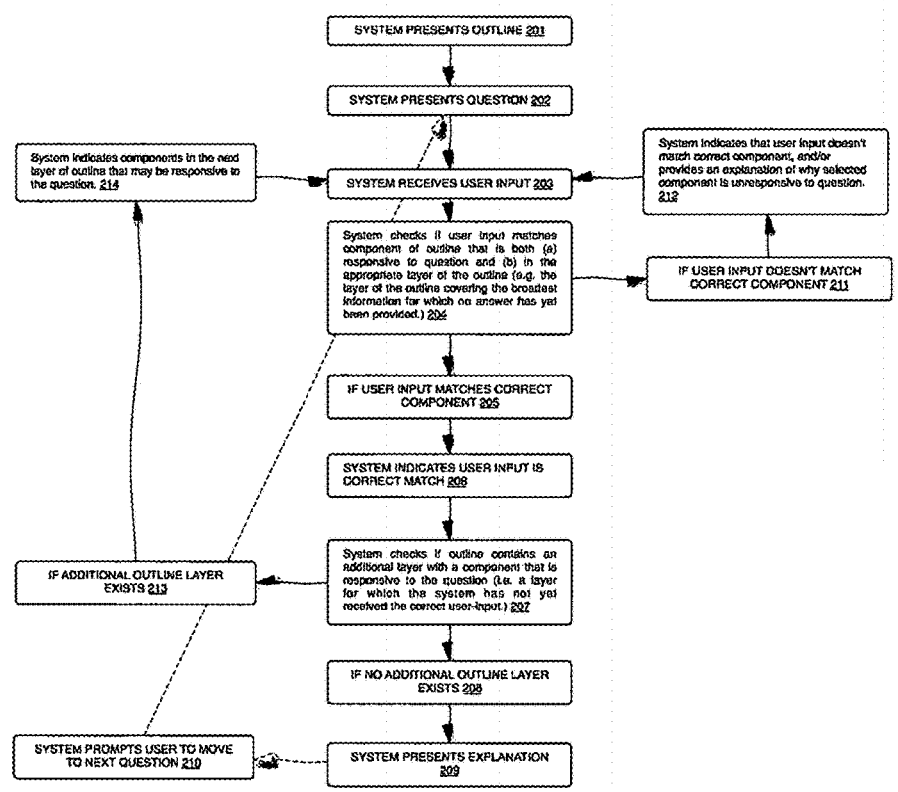
FIG. 2 illustrates an example procedure in accordance with an example embodiment of the present invention.

FIG. 2 illustrates an example of an interactive outline learning system procedure. In 201, the interactive outline learning system presents the user with an outline. In some example embodiments, the outline may contain some or all of the content of the focus subject or topic; in other example embodiments, the outline may merely contain possible steps in answering a given question. In some example embodiments, the outline may include multiple layers; these layers may be organized from left to right, from right to left, from top to bottom, from bottom to top, along multiple axis (e.g. new layers/steps are to the right and bottom, or radiate outward or inward as if part of a circle), or in any other reasonable layout. In some example embodiments, the content within these layers may be organized from the most broad to the most specific, the most specific to the most broad, or in any other reasonable manner. In some example embodiments, each possible answer may be divided into the same number of outline layers; in other embodiments, different answers may be divided into differing numbers of outline layers. In some example embodiments, the entire outline may be immediately displayed to the user; in other example embodiments, only one part or parts of the outline may be displayed initially, and more parts may be made visible after receiving input from an user; in yet other example embodiments, the outline might be "collapsible," such that when a topic within an outline has been selected (or perhaps only when the correct topic has been selected), the subheadings and/or other content that falls under that topic will be made visible. In some example embodiments, the outline components within one layer or step may be grouped. For instance, in one layer, there may be multiple blocks, each block containing one or multiple outline components that share some relationship. Any reasonable configuration may be employed.

Not all outlines need to be organized into layers, some example embodiments may organize outlines into forms resembling flow charts, decision trees, diagrams, and/or any other reasonable form that portrays the interrelationship between at least some concepts within the focus subject or topic. In some example embodiments, that will result in the interactive outline learning system's components being organized in a manner that does not correspond to one or more axis (i.e. the next steps in an outline may be displayed to the left, right, top, and bottom of the current step all at once, or in a multitude of additional directions.) In some example embodiments, the system's outline components may display more complicated relationships then the simple hierarchical relationship displayed for illustrative purposes elsewhere in this document. For instance, two components earlier in the outline may converge on the same component later in the outline. Also, for instance, an outline component in a later step may loop back and connect to an outline component in an earlier step. Any reasonable order or configuration may be employed. Also, in some example embodiments, the outline components may link to longer explanations, for example an outline component that includes an abbreviation may, when the mouse component clicks on or hovers over the component, display a text box that includes the unabbreviated text, or a longer explanation of what that component means or why it is positioned as it is. Any reasonable method may be employed for making this additional information accessible, and the additional information may be in any reasonable form and coney any reasonable content, or the outline may not contain this feature.

In 202, the interactive outline learning system presents the user with a question. In some example embodiments, the question may be one-part or multi-part, or may take the form of a narrative, in which different parts of the narrative may be analyzed by different parts of the outline. In some example embodiments, the question may be presented in text, in an equation or numeral format, and/or in an auditory prompt. In some example embodiments, the question will always be answered by the outline presented; in other example embodiments, the outline may not yet be presented, and answering the question may require navigation to the correct outline; in other examples embodiments, the question may be answered by two or more outlines (e.g. the final answer in the first outline may refers and link to a second outline necessary for answering the particular question.)

In 203, the interactive outline learning system receives input from an user. In some example embodiments, the receipt of information may be accomplished by use of a keyboard, a mouse click or drag-and-drop or other manipulation, a touch pad, a touch screen, a device that interprets a user's body or eye movement, and/or a microphone, and/or any other reasonable method.

In 204, the interactive outline learning system checks whether the user input matches the component of the outline that is both responsive to the question and in the appropriate layer (or step, if layers are not employed) of the outline. In essence, the interactive outline learning system checks whether the correct answer has been received. In some example embodiments, this may be accomplished by referring to a hidden part of the question component presented in 202. In other words, each question may be paired with one or more answers, but those answers will not be made visible to an user. In this way, the interactive outline system can check the correctness of user input against a portion of the question component which is itself hidden by code. In other example embodiments, the question component may contain coded information that relates to a database, and a distinct answer component may be located within that database. It is noted that any reasonable configuration and/or procedure may be employed for checking the correctness of user input. In some example embodiments, the interactive outline learning system might be configured to check whether the user input matches any component of the outline that is responsive to the question, thereby allowing user input to immediately identify a component of the outline beyond the initial layer (or step.)

In some example embodiments, the response of the interactive outline learning system to user input depends on whether the system verifies that the user input matches or otherwise corresponds to the correct component of the outline 205, or whether the system determines that user input does not match or otherwise correspond to the correct component of the outline 211. In the former circumstance, in some example embodiments the system may indicate that user input matches or corresponds to the correct outline component 206. In some example embodiments, the system may indicate this visually. For instance, the system may change the appearance of the text in the outline, the appearance of the text container, and/or the appearance of any line under the text container or above, beside, and/or around the text container, or employ any other reasonable visual indicator. In some example embodiments, the visual indications may extend to related areas of the outline, which is also discussed below in relation to step 214. For instance, the system may change the appearance of any lines connecting the text container containing the correct answer to other text containers in the outline, or may change the appearance of text, text containers, and lines in part or all of the section of the outline related to the correct answer, or employ any other reasonable visual indicator. In other example embodiments, the system may change areas of the outline unrelated to the correct outline component, for instance, by making those elements of the outline less distinct or not visible to an user, or employ any other reasonable visual indicator. It is noted that changes in appearance may include changes in text font, text color, text distinctness, text style (e.g. bold, italics, and/or underlined), container or line color, container or line size, container or line distinctness, and any other reasonable visual indicator. In some example embodiments, in addition or in the alternative to visual indicators, the system may employ auditory, tactile, or other sensory indicators. For instance, the system may produce a sound that's indicative of a correct answer, which sound may change or not change based on the layer or step in the outline that is currently in focus; and/or the system may produce a voice recording of the correct component being recited, an explanation of why the correct component is correct, or any other sound or recording that reasonably indicates the correct component. Also for instance, the mechanical component (e.g. mouse or controller or cell phone) receiving user input may vibrate to indicate that user input matches the correct outline component. It is noted that any reasonable sensory indicator may be employed to indicate that user input matches the correct outline component.

In some example embodiments, after the interactive outline learning system verifies that user input matches the correct outline component, the system may also check whether the outline contains an additional layer or step that is responsive to the question presented 207. In some example embodiments, this may be accomplished by labeling the individual components that receive user input, and verifying which component received the most recent user input. For instance, the system may include a number of text input fields (internally identified as text input field 1, text input field 2, text input field 3, etc.), and the system may determine that an additional layer or step in the outline exists because the one or more text input fields have not yet received user input. In other example embodiments, the interactive outline learning system may determine whether an additional layer or step exists by referencing the answer component corresponding to the question component, or by referencing the outline itself. Any reasonable method may be used to make this determination.

In some example embodiments, the response of the interactive outline learning system to user input depends on whether the system determines that an additional outline layer or step exists that is responsive to the question 213, or whether the system determines that no additional layer or step exists that is responsive to the question 208. In some example embodiments, the former circumstance will occur one or more times before reaching the latter circumstance, but this narrative first discusses the latter circumstance. In the latter circumstance, in some example embodiments, the interactive outline learning system may present the user with an explanation. In terms of presentation, in some example embodiments the explanation may take the form of an alert box, may replace the question component, may be displayed in addition to the question component, or may be displayed in any reasonable manner.

In some example embodiments, after the explanation component is presented, the interactive outline learning system prompts the user to navigate to the next question 210. In some example embodiments, this may consist of visually indicating the method for moving to the next question. In other example embodiments, the system may not use a prompt. For instance, the system may not prompt the user, but nonetheless wait for an user to move to the next question. As another example, the system may navigate to the next question automatically, without receiving any input from an user. In some example embodiments, after the system receives input from an user attempting to move to the next question, the system may display a new question. In some example embodiments, the outline displayed may not change. In other example embodiments, the outline displayed may change in part or totally in order to correspond to the question asked.

Above, in paragraph 0029, it was described that in some example embodiments, after the system verifies that user input matches the correct outline component 205 and indicates the same 206, the interactive outline learning system would check whether any additional layer or step within the outline is responsive to the question 207. If the interactive outline learning system determines that an additional layer or step in the outline exists that is responsive to the question 213, then the interactive outline learning system may indicate the components in the next layer of the outline that may be responsive to the question 214. Step 214 may also be completed at or about the same time as the system indicates that user input matches the correct outline component. In some example embodiments, the indicators referenced in step 214 may take the form of changes to the visual appearance of lines connecting the correct component to the possible answers in the next layer or step of the outline, and changes to the visual appearance of the text and text containers of the possible answers in the next layer or step of the outline. It is noted that changes in appearance may include changes in text font, text color, text style (e.g. bold, italics, and/or underlined), container or line color, container or line size, container or line distinctness, and any other reasonable visible indicator. In addition or in the alternative to changes in the visual appearance of only possible answers in the next layer or step, in some example embodiments the interactive outline learning system may indicate all answer choices in the next layer of step (i.e. even if they are not under the heading of the previous answer.) In addition or in the alternative to the changes in appearance discussed above, the interactive outline learning system may visually indicate which part of the outline is the responsive to the next answer, for instance by embedding a text input field in that layer and moving the cursor and focus to that text input field when appropriate, or by making the content in that part of the outline able to be selected (e.g. with a mouse click, or with a touch to a touch screen) when appropriate. In some example embodiments, in addition or in the alternative to the visual indicators discussed above, the interactive outline learning system may also indicate the possible answers in the next layer or step of the outline by playing an audio voice recording of the possible answers being read aloud, or a recording that otherwise indicates or describes the next possible answers. At some point after step 214, the interactive outline learning system would return to step 203, and receive user input that may be evaluated for whether it matches the correct outline component in the layer or step of the outline now in focus.

Above, in paragraph 0027, it was described that in some example embodiments, after the system receives user input 203, the system may check whether the user input matched the component of the outline that is both responsive to the question and in the layer or step of the outline currently in focus 204. If the user input does not match correct outline component 211, then in some example embodiments the system may indicate that the user input doesn't match the correct component and/or provide an example of why the selected component is unresponsive to the question 212. For instance, the system may make changes to the visual appearance of the selected component, such as changing the font color, style, or size; background color; the color or distinctness of any lines associated with the selected content; make the selected outline component not visible to the user; and/or any other change in visual appearance that would reasonably indicate the incorrect outline component was selected. In addition or in the alternative to the visual changes described above, the system may produce a sound that would indicate an incorrect answer (e.g. the buzzer sound employed on some game shows). In addition or in the alternative, in some example embodiments the system may display an explanation of why the selected component is not responsive to the question, for example in the form of an alert box. In some example embodiments, step 212 may be bypassed, and there will be no visual or other sensory indicator that user input matches an incorrect component of the outline. In these example embodiments, the system may or may not prevent an user from attempting to move even further down the incorrect path in the outline. The better approach is to prevent the user from attempting to move further down the incorrect path in the outline. This may be accomplished, for instance, by only accepting text in a text input field corresponding to the next layer or step of the outline after the correct answer has been received in the previous layer or step, or by only making the components in the next layer or outline be responsive to mouse clicks or touches on a touch screen only after the correct answer has been received in the previous layer or step. In these example embodiments, the system's inaction would indicate that user input does not match the correct outline component. At some point after the system indicates that user input doesn't match the correct outline component, the interactive outline learning system would return to step 203, and receive user input that may again be evaluated for whether it matches the correct outline component in the current layer or step of the outline. Alternatively, in other example embodiments, when system has determined that user input matches an incorrect outline component, the interactive outline learning system may prevent the user from attempting to answer the question again. In these example embodiments, the system may indicate that user input matches an incorrect outline component and/or provide an explanation of why the selected component is incorrect and/or what the component(s) of the outline are responsive to the question. In these example embodiments, the system may then present another question to the user 202.

It is noted that the order of steps in FIG. 2 may be modified, and that some steps may be omitted. For instance, in some example embodiments, the system may present the outline, 201, and present the question, 202, simultaneously, or may present the question first. In some example embodiments, the system may not indicate that user input doesn't match the correct component, as described in step 212. In some example embodiments, the system may indicate that user input matches or otherwise corresponds to the correct outline component, 206, while simultaneously indicating what components in the next layer of the outline may be responsive to the question, step 214, or these steps may be reversed. In some example embodiments, the system may indicate that user input matches or otherwise corresponds to the correct outline, 206, while simultaneously presenting an explanation to the question, or these steps may be reversed. In some example embodiments, the system may present an explanation, 209, at multiple points during the process, for example after the system verifies that user input matches or otherwise corresponds to the correct outline component, 206, and/or after the system verifies that user input does not match or otherwise correspond to the correct outline component, 211, or at any other appropriate juncture. In some example embodiments, the system may not present an explanation, as described in step 209. In some example embodiments, the system may not prompt the user to move to the next question, for example if the system automatically navigates the user to the next question. In some example embodiments, the interactive outline learning system will only receive user input, 203, for a given outline step after the system has received correct user input for the prior step; in other example embodiments, the interactive outline learning system may receive user input for more or all layers of the outline, potentially allowing all layers of the outline to be bypassed if user input matches the correct answer in the final layer of the outline; in other example embodiments, the interactive outline learning system may receive user input that leads a user down an incorrect branch, and may perhaps visually or otherwise indicate that the incorrect branch of the outline has been chosen; in other example embodiments, the interactive outline learning system may visually indicate the correct outline component after an incorrect outline component has been selected, in which case they interactive outline learning system may direct the user to the correct outline branch in spite of incorrect user input. In other example embodiments, step 203 involving the receipt of user input may be bypassed, and the interactive outline learning system may operate in a more exemplary fashion. Any reasonable order of steps, whether that order omits some steps, repeats some steps, and/or changes the order of steps, can be employed.

FIG. 3 through 11 display one example embodiment of an interactive outline learning system in the context of American property law and specifically foreclosure priorities. The interactive outline learning system may be employed to teach different subject matters, in the legal context or another context, such as, but not limited to, finance, engineering, history, grammar, or mathematics. The below description of these figures is intended to be illustrative rather than limiting.

Figure 3:
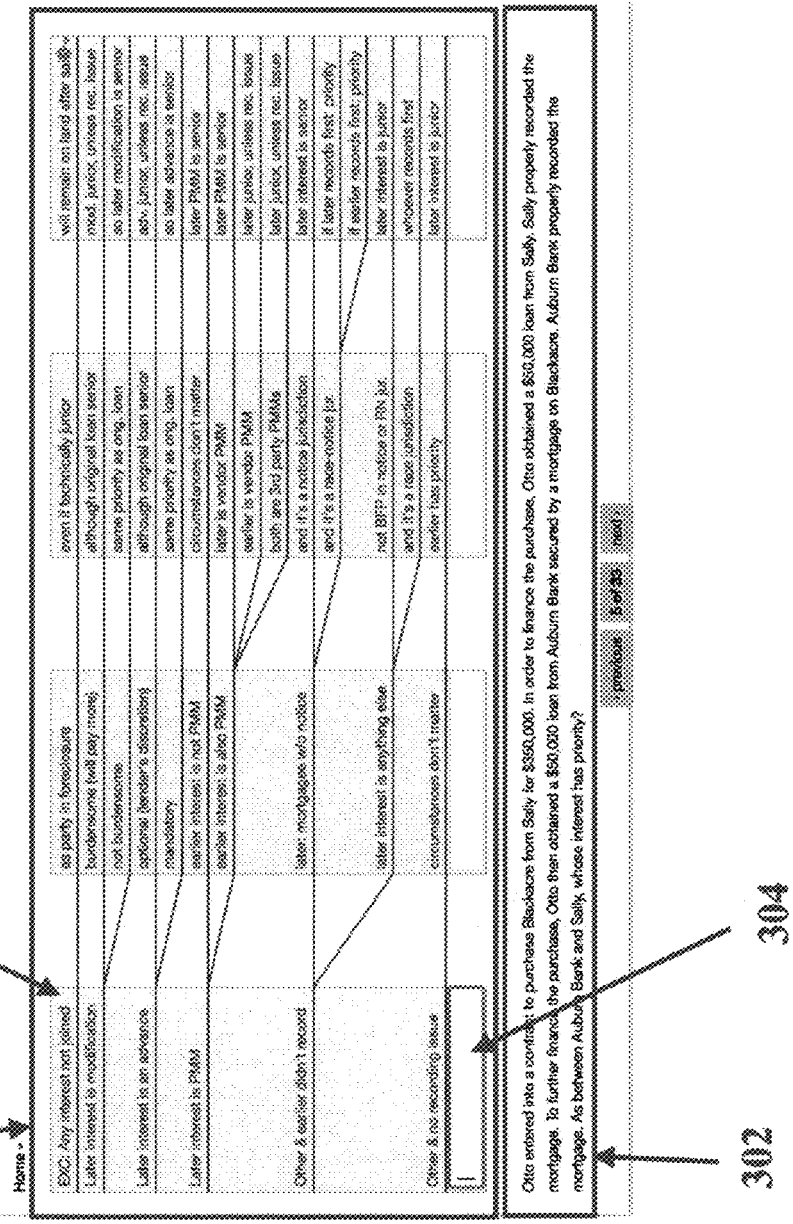
FIG. 3 illustrates an example interactive outline learning system in accordance with an example embodiment of the present invention.

FIG. 3 displays two components: an outline component (301) described in step 201 and a question component (302) described in step 202. The column farthest to the left (303) contains an active text input field (i.e. the box fringed in blue) (304). As discussed above, the system's outline component may be organized in many different ways. The present embodiment demonstrates a particularly effective method, as it displays all the information to a user without the need for scrolling, which therefore facilitates the creating of a mental map.

Figure 4:
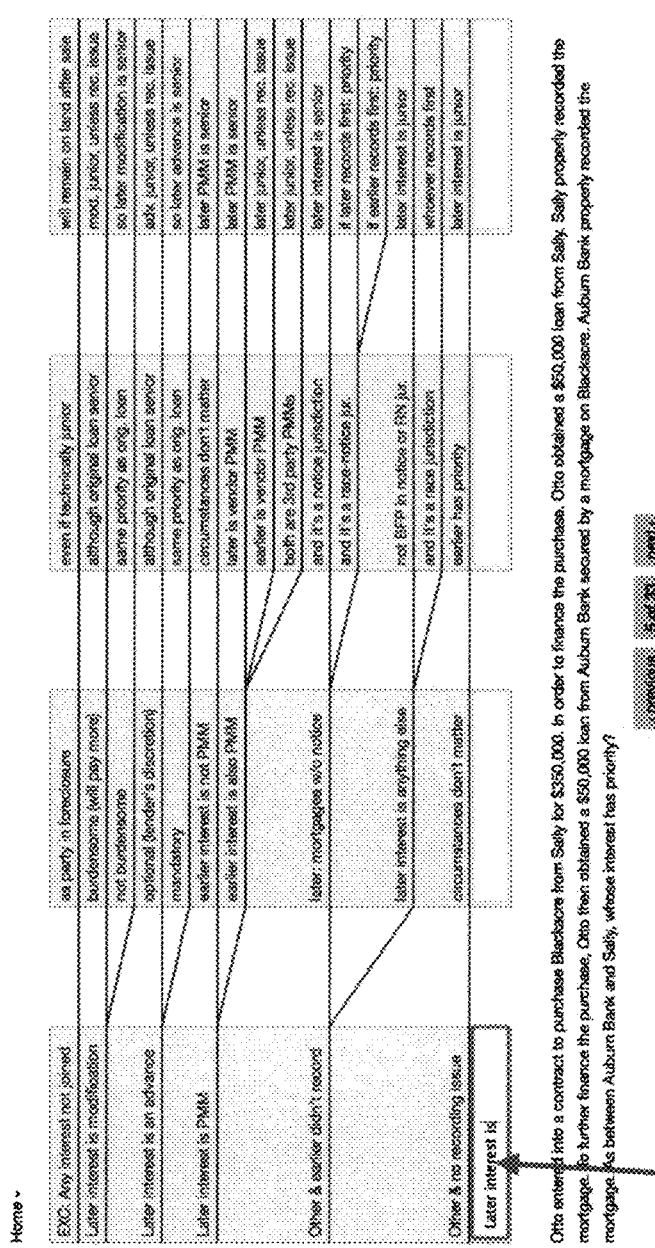
FIG. 4 illustrates an example interactive outline learning system in accordance with an example embodiment of the present invention.

FIG. 4 displays text being entered (401) into the text input field (304) in the left-most column of the example embodiment's outline (303). In the example embodiment displayed, user input is received as text input. As discussed above, in other example embodiments, user input may be received as a mouse click, a touch to a touch screen, dragging and dropping element(s) on the page, recording of a body or eye movement, vocalizations, and/or any method reasonably possible using existing or future technology.

Figure 5:
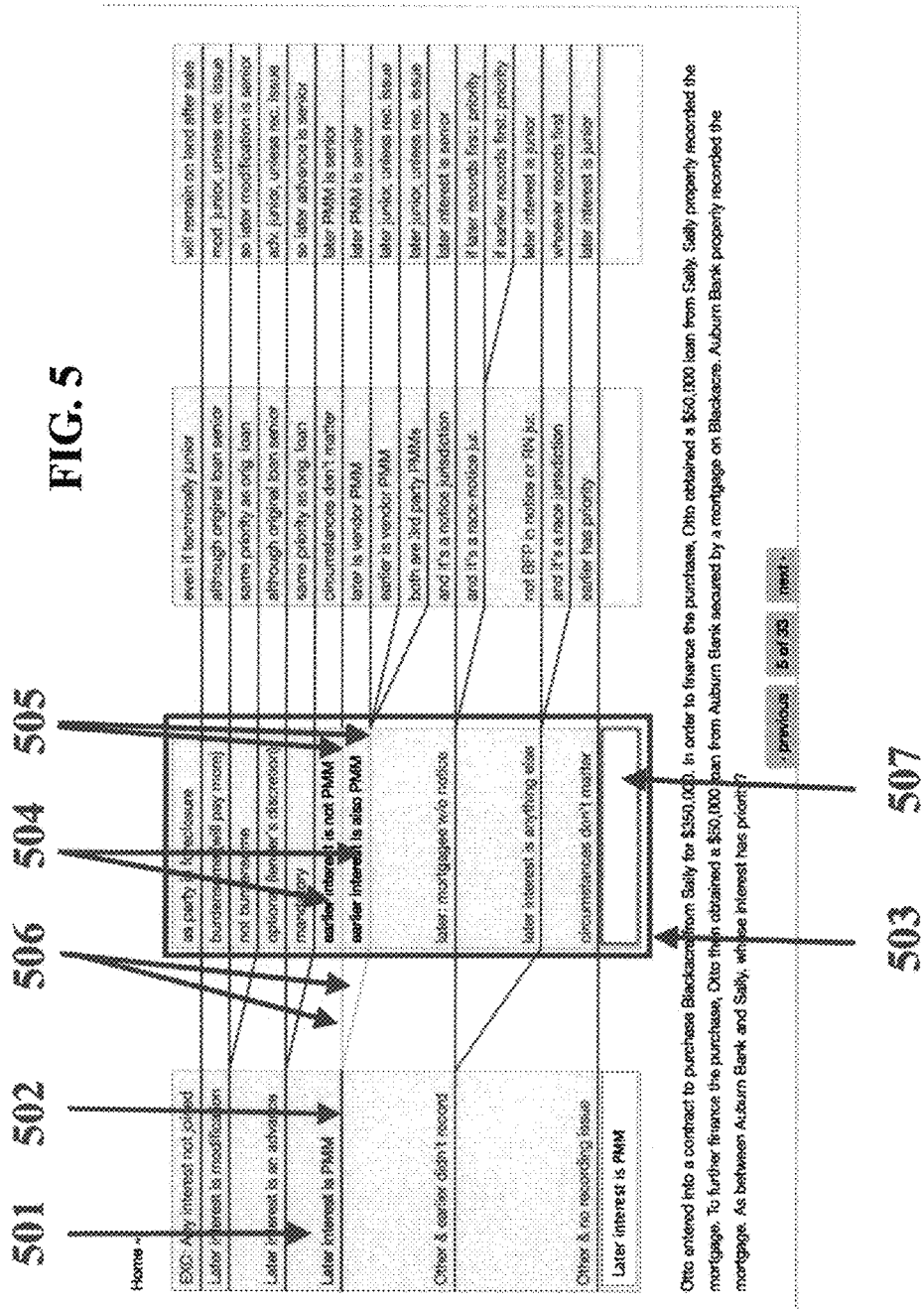
FIG. 5 illustrates an example interactive outline learning system in accordance with an example embodiment of the present invention.

FIG. 5 displays the example embodiment of an interactive outline learning system indicating that user input matches the correct outline component as described in step 206. (In the example question, the correct answer is "Later interest is PMM" and PMM is a common legal abbreviation for "purchase money mortgage.") When the interactive outline learning system verifies that user input matches the correct outline component in this example embodiment, the system indicates the correct answer within the outline by changing the color of its text (501) and underline (502) from grey to red. Because an additional outline layer exists (503) as described in step 213, the interactive outline learning system also indicates the components in the next layer that may be possible answers as described in step 214. The system changes the color of the text of possible answers from grey to black (504), changes the color of the underline of possible answers from grey to yellow (505), and changes the color of the connecting lines between the correct answer in the first column and possible answers in the second column from grey to yellow—those connecting lines are labeled as 506. Because of the computing speed of the computer used in this example (as well as most other modern computers), steps 207 and 214 appear to occur simultaneously. As described above, other embodiments may employ other visual, auditory, tactile, or other sensory methods to indicate that user input matches the correct outline component. Finally, in this example embodiment, the system moves the cursor to and focuses on the text input field in the second outline column (507), thereby effecting the return to step 203, i.e. receiving user input.

Figure 6:
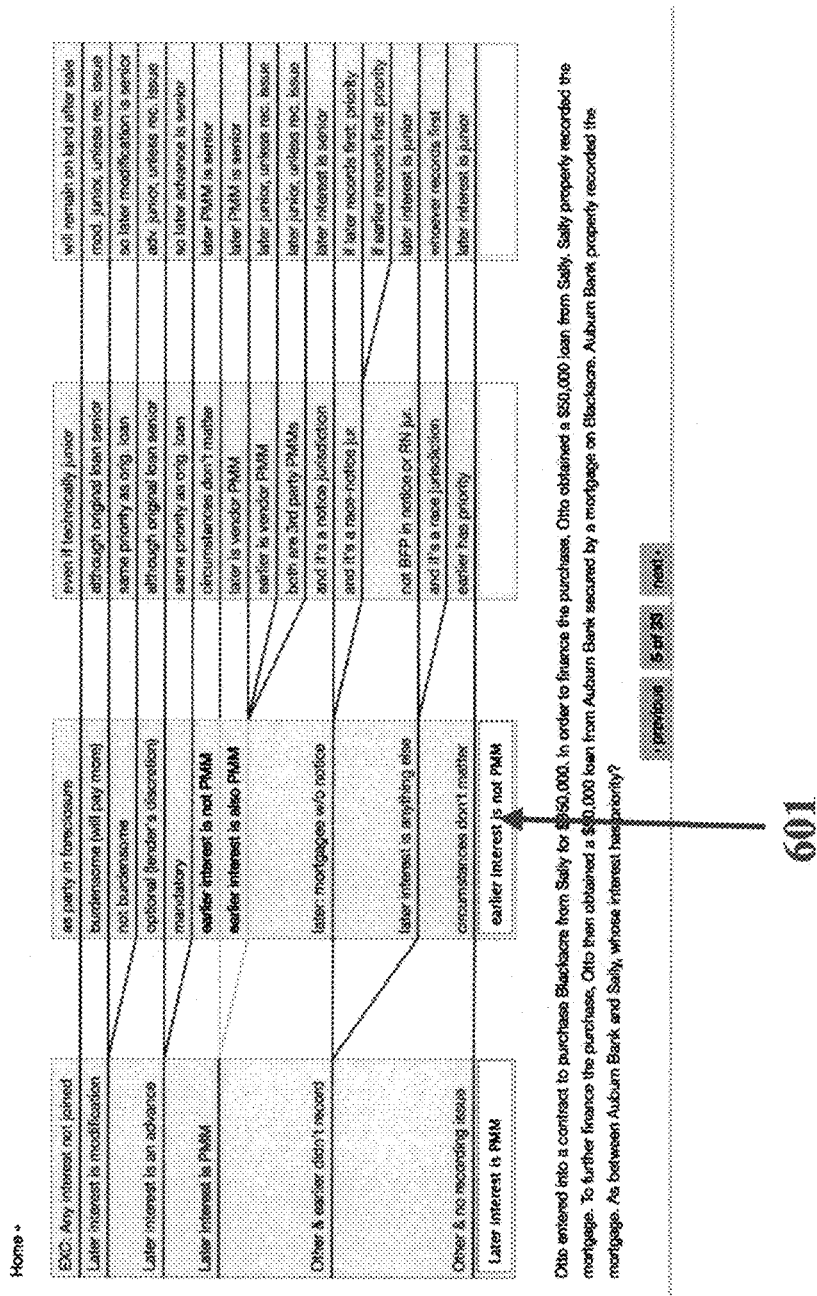
FIG. 6 illustrates an example interactive outline learning system in accordance with an example embodiment of the present invention.

FIG. 6 displays the example embodiment's response to when user input (601) does not match the correct outline component. (In the example, user input says "earlier interest is not PMM" and that does not match the correct outline component.) In the example embodiment displayed, the interactive outline produces no visual or other sensory indicators that an incorrect answer has been supplied, in essence eliminating step 212. As discussed above, the system may display various visual, auditory, tactile (e.g. vibrating), or other sensory changes to indicate that user input does not match the correct outline component; the system may provide a visual or auditory explanation of why the user input does not match the correct outline component or why the correct outline component is in fact correct; and/or the system may not accept alternative user input and prompt the user to move to the next question.

Figure 7:
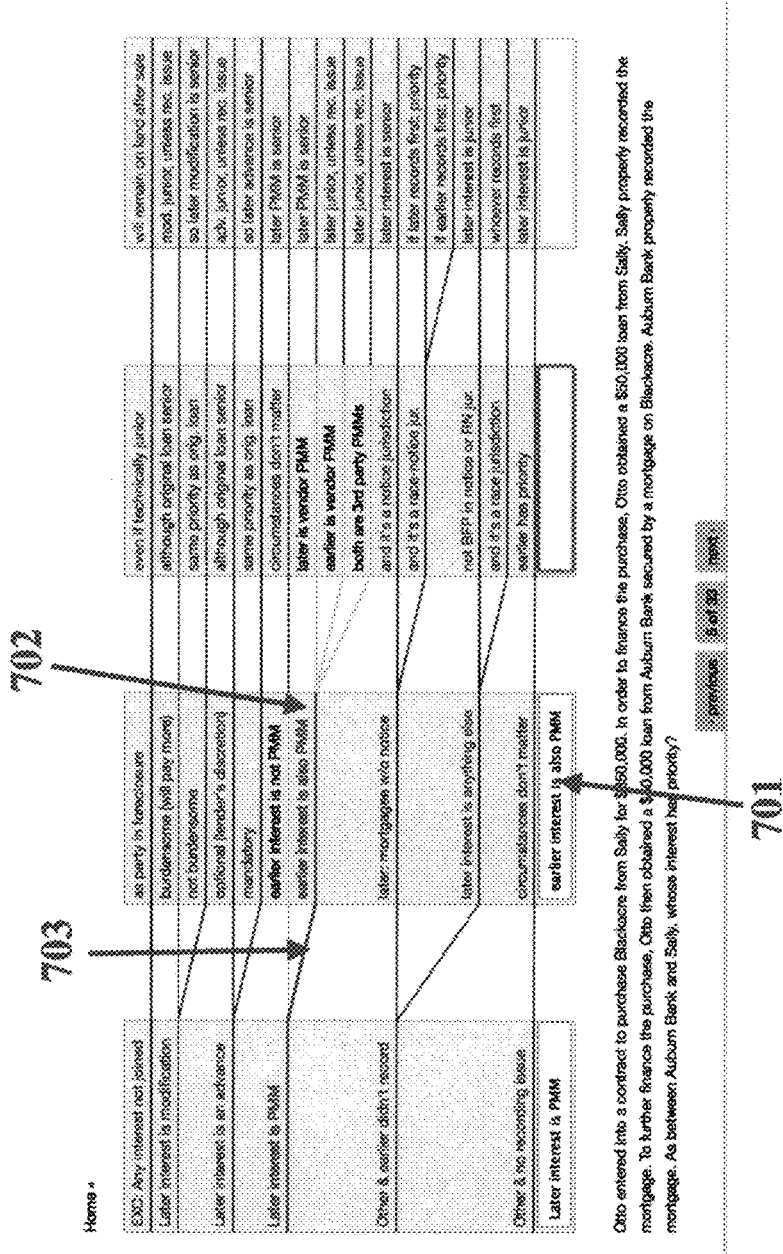
FIG. 7 illustrates an example interactive outline learning system in accordance with an example embodiment of the present invention.

FIG. 7 displays the example embodiment's response when user input (701) for the second layer (503) or step of the outline matches the correct outline component (702). (In the example, the correct answer is "earlier interest is also PMM".) The system's changes are similar to the changes displayed and described above in relation to FIG. 5, with one main difference: the connecting line to the left of the second column—i.e. the line connected to the right answer in column 1 (703)—is also changed to the color red.

Figure 8:
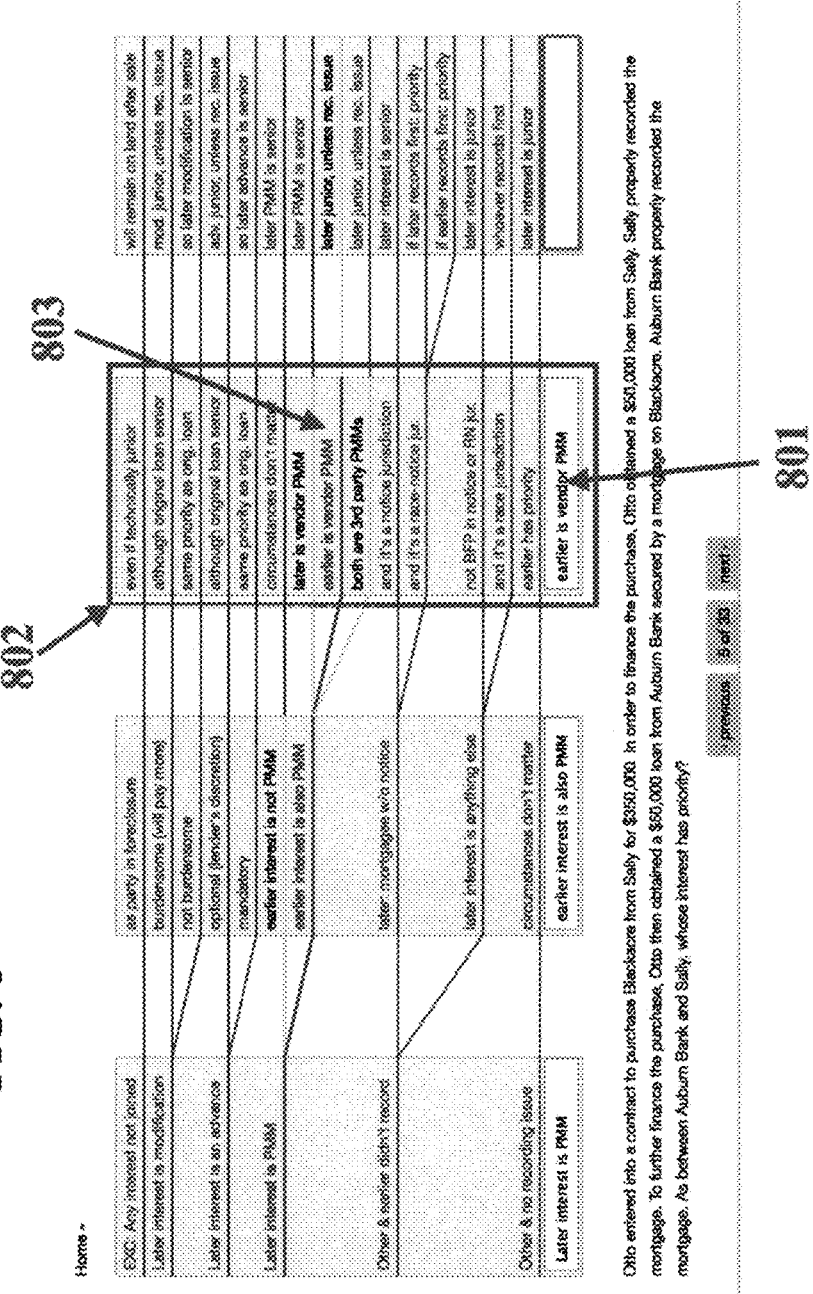
FIG. 8 illustrates an example interactive outline learning system in accordance with an example embodiment of the present invention.

FIG. 8 displays the example embodiment's response when user input (801) for the third layer (802) or step of the outline matches the correct outline component (803). The result does not differ nearly at all from the system's changes when user input for the second layer or step of the outline matched the correct outline component, discussed above in relation to FIG. 7.

Figure 9:
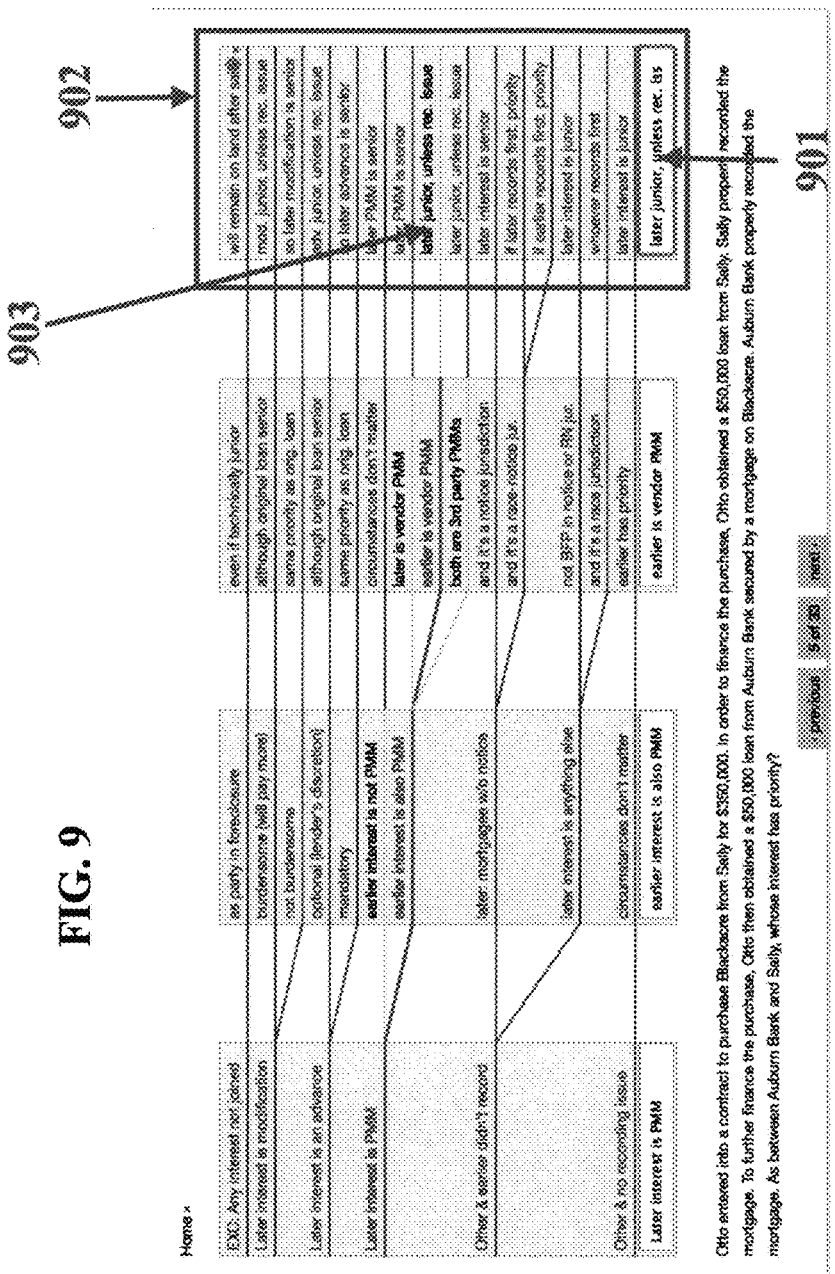
FIG. 9 illustrates an example interactive outline learning system in accordance with an example embodiment of the present invention.

FIG. 9 displays text entered into the fourth text input field area (901) of the example embodiment's outline, similar to what was discussed above in relation in FIG. 4. The text is not yet complete. In this example embodiment, the content of the outline's final layer (902) is responsive to whatever question is posed about foreclosure priorities, and the only possible answer in the last column (the possible answer is labelled 903) is responsive to the particular question posed in this example; the nature of the content of the final and all preceding layers or steps may vary greatly depending on the subject matter and what is judged the best approach for teaching the subject matter with the interactive outline learning system. For instance, in other example embodiments, the final layer/step of an outline may contain the broadest outline components.

Figure 10:
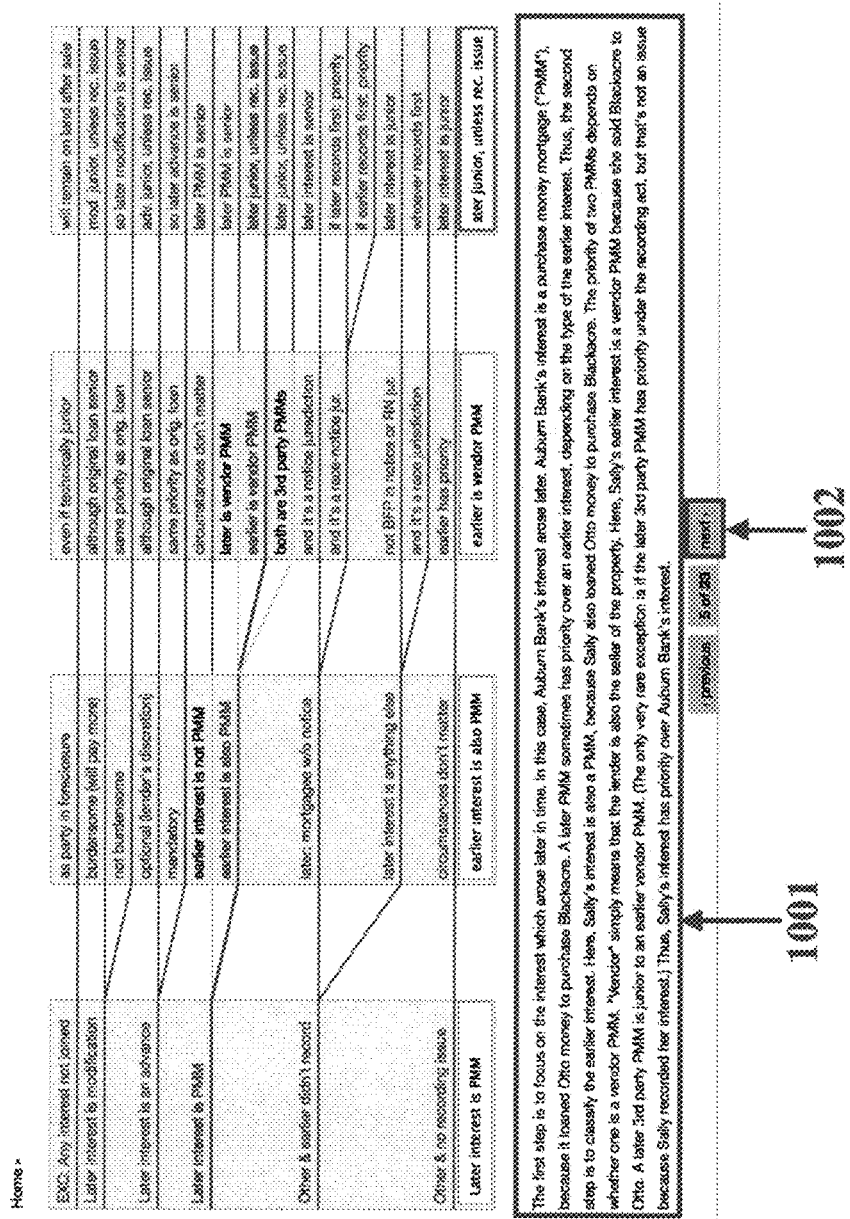
FIG. 10 illustrates an example interactive outline learning system in accordance with an example embodiment of the present invention.

FIG. 10 displays the example embodiment's response when user input for the fourth layer (901) or step of the outline matches the correct outline component (903). The response is similar to that when user input matched the correct outline component in the first, second, and third columns, as discussed above in relation to FIG. 5, FIG. 7, and FIG. 8, respectively. In addition, because the system checked whether the outline contains an additional layer as described in step 207, and determined that no additional layer exists as described in step 208, the system presented an explanation component (1001) as described in step 209. In the present example embodiment, the explanation component replaces the question component in the display; in other example embodiments, the explanation component may be displayed in addition to the question component, for instance in a pop-up box or simply at a different spot on the page. In some example embodiments, the system might not present an explanation component at all. In FIG. 10, the system might also prompt the user to move to the next question, as described in step 210, for instant by moving cursor focus to or highlighting the button or link to the next question. In this example embodiment, the system instead simply waits for user input, which would entail a mouse click on the next button (1002).

In some example embodiments, an explanation component may be replaced or supplemented by level-specific instructions, help, or explanations. For example, when ready to receive user input corresponding to an element in the first level of the outline, the example embodiment may display a message explaining the first step in the analysis of the problem (e.g. "The first step in the analysis is to . . . "). When ready to receive user input corresponding to an element in the second level of the outline, the example embodiment may display a message explaining the second step in the analysis of the problem (e.g. "The second step in the analysis is to . . . "). When ready to receive user input corresponding to additional steps in the analysis, the example embodiment may display messages corresponding to those steps in the analysis.

Figure 11:
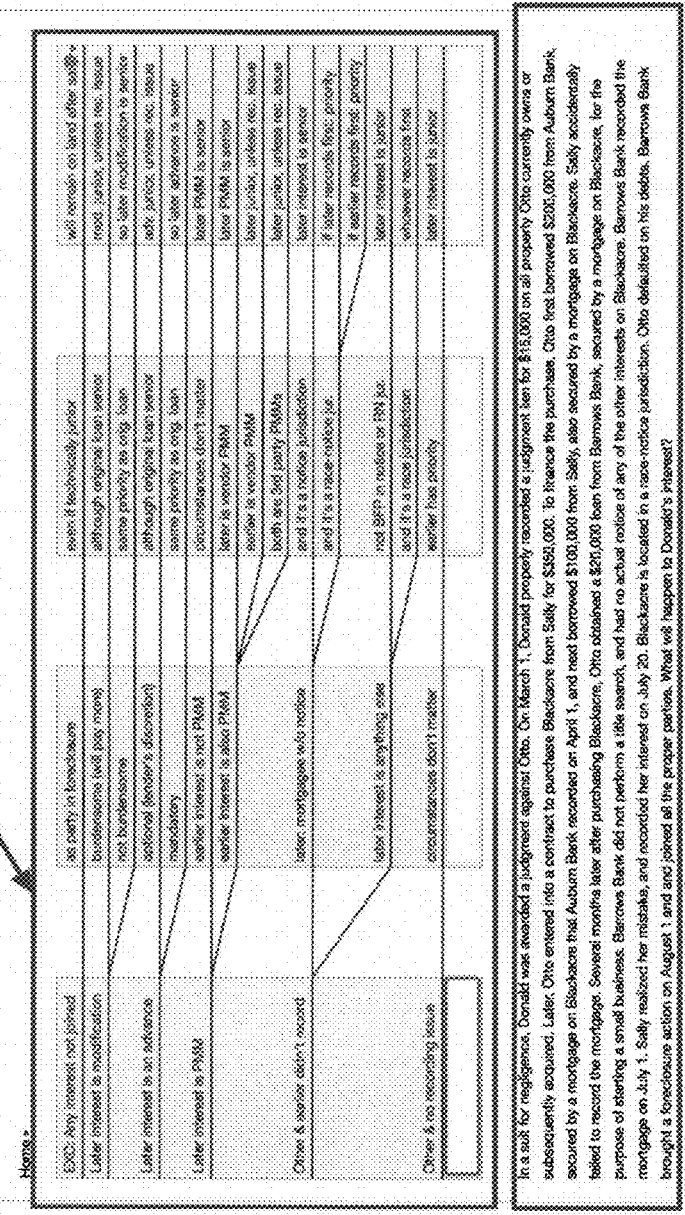
FIG. 11 illustrates an example interactive outline learning system in accordance with an example embodiment of the present invention.

FIG. 11 displays the example embodiment's response after the system moves to the next question. In this example embodiment, the system presents the same outline component (301, labelled again here as 1101) and a new question component (1102), which returns the system to step 202. As discussed above, in other example embodiments, the outline content may also partly or completely change for a new question. In most cases, the better embodiment will employ an outline with unchanging content between questions within a subject area, so as to facilitate the creation of a visual and mental map among users.

The example embodiments of the present invention described above are provided by way of illustration only. The present invention is not to be understood as limited to the example embodiments described herein. In addition, regardless of any indication otherwise which may appear in this application, no process or portion of a process described herein need be carried out by a specific person, party, or entity, unless expressly indicated otherwise in the claims.

The invention claimed is:

1. A method of instruction, comprising: presenting an outline of a subject matter area, wherein the outline has two or more levels corresponding to steps in a multi-part analytical method and each level of the outline has two or more elements; presenting the aforementioned outline as an image via a computer system;
   - presenting a question relating to the subject matter area, wherein the question can be solved with a multi-part analysis in which each part of the analysis corresponds to a different level of the outline;
   - presenting the aforementioned question via a computer system;
   - receiving a first input identifying a first selected element from a first level of the outline;
   - determining whether the first selected input correctly represents a first step in analyzing the question;
   - in response to the first selected element correctly representing the first step in analyzing the question, displaying a visual indication that a second element may be selected;
   - receiving a second input identifying a second selected element from a second level of the outline; and
   - determining whether the second selected element correctly represents a second step in analyzing the question.

2. The method of claim 1, further comprising:
   in response to the student correctly selecting the second element that correctly represents the second step in analyzing the question, the computer system displaying a visual indication in the image of the outline that a third element may be selected from a third level of the outline.

3. The method of claim 2, wherein:
   in response to the student correctly selecting the second element that correctly represents the second step in analyzing the question, the computer system displaying a visual indication in the image of the outline that shows which subset of elements in the third level of the outline potentially correspond to the third step in the multi-part analysis of the question.

4. The method of claim 2, further comprising:
   in response to a student entering input into the computer system that correctly identifies the element in the second level of the outline that represents the second part of the multi-part analysis for solving the question, the correct selected element in the second level of the outline is further indicated by visually highlighting a line or lines drawn between the correct selected element in the second level of the outline and the element or elements in the third level of the outline that may represent the third sub-part in the multi-part analysis necessary to answer the question.

5. The method of claim 4, wherein:
   the highlighting is accomplished by changing color of the line or lines displayed on a computer screen that connects the second selected element in the second level of the outline and the elements in the third level of the outline that may represent the third sub-part in the multi-part analysis necessary to answer the question.

6. The method of claim 2, further comprising:
   receiving a third input identifying a third selected element from a third level of the outline;
   determining whether the third selected element correctly represents third step in the multi-part analysis of the question; and
   in response to the third selected element correctly representing the third step in analyzing the question, displaying a visual indication that a fourth element may be selected from a fourth level of the outline, or if the third step in the analysis is the final step in the multi-part analysis necessary to solve the question, indicating that the third selected element has supplied the answer to the question.

7. The method of claim 6, further comprising:
   in response to a student entering input into the computer system that correctly identifies the element in the third level of the outline that represents the third part of the multi-part analysis for solving the question, the correct selected element in the third level of the outline is further indicated by visually highlighting a line or lines drawn between the correct selected element in the third level of the outline and the element or elements in the fourth level of the outline that may represent the fourth sub-part in the multi-part analysis necessary to answer the question.

8. The method of claim 7, wherein:
   the highlighting is accomplished by changing color of the line or lines displayed on a computer screen that connects the third selected element in the third level of the outline and the elements in the fourth level of the outline that may represent the fourth sub-part in the multi-part analysis necessary to answer the question, or if the third step in the analysis is the final step in the multi-part analysis necessary to solve the question, indicating that the third selected element has supplied the answer to the question.

9. The method of claim 7, further comprising:

receiving a fourth input identifying a fourth selected element from a fourth level of the outline;

determining whether the fourth selected element correctly represents a fourth step in the multi-part analysis of the question; and in response to the fourth selected element correctly representing the fourth step in analyzing the question, displaying a visual indication that a fifth element may be selected, or if the fourth step in the analysis is the final step in the multi-part analysis necessary to solve the question, indicating that the fourth selected element has supplied the answer to the question.

10. The method of claim 6, further comprising:

in response to the student correctly selecting each element from each level of the outline that correspond to all of the steps in the multi-part analysis of the question, presenting an explanation to the question.

11. The method of claim 1, wherein:

in response to a student entering input into the computer system that correctly identifies the element in the first level of the outline that represents the first part of the multi-part analysis for solving the question, the correct selected element in the first level of the outline is further indicated by visually highlighting a line or lines drawn between the first selected element in the first level of the outline and the element or elements in the second level of the outline that may represent the second sub-part in the multi-part analysis necessary to answer the question.

12. The method of claim 11, wherein:

the highlighting is accomplished by changing color of the line or lines displayed on a computer screen that connects the first selected element in the first level of the outline and the elements in the second level of the outline that may represent the second sub-part in the multi-part analysis necessary to answer the question.

13. A system of instruction, comprising:

a display configured to display an outline, wherein the outline has two or more levels corresponding to steps in an analytical method and each level has two or more elements, and a question, wherein the question can be solved with a multi-part analysis in which each part of the analysis corresponds to a different level of the outline presented on the display;

an input device configured to receive input identifying a first selected element from a first level of the outline;

a computer configured to determine whether the first selected input correctly represents a first step in analyzing the question;

wherein the display is further configured such that, in response to the computer determining that the input received by the input device correctly represents the first step in analyzing the question, the display will display a visual indication that a second element may be selected;

wherein the input device is further configured to receive input identifying a second selected element from a second level of the outline; and wherein the computer is further configured to determine whether the second selected input correctly represents a second step in analyzing the question.

14. The system of claim 13, wherein:

the display is further configured such that, in response to the computer determining that the input received by the input device correctly represents the second step in analyzing the question, the display will display a visual indication that a third element may be selected.

15. The system of claim 14, wherein:

the input device is further configured to receive input identifying a third selected element from a third level of the outline;

the computer is further configured to determine whether the third selected input correctly represents a third step in analyzing the question; and the display is further configured such that, in response to the computer determining that the input received by the input device correctly represents the third step in analyzing the question, the display will display a visual indication that a fourth element may be selected.

16. The system of claim 15, wherein:

the input device is further configured to receive input identifying a fourth selected element from a fourth level of the outline;

the computer is further configured to determine whether the fourth selected input correctly represents a fourth step in analyzing the question; and the display is further configured such that, in response to the computer determining that the input received by the input device correctly represents the fourth step in analyzing the question, the display will display a visual indication that the correct step has been selected.

* * * * *